United States Patent Office 3,325,502
Patented June 13, 1967

3,325,502
1-ALLYL-3-(3-HYDROXYPHENYL)-PIPERIDINE COMPOUNDS
Hiroshi Kugita, Daito, Goro Hayashi, Toyonaka, Toyonari Oine, Osaka, Hirozumi Inoue, Yao, and Seiichi Nurimoto, Osaka, Japan, assignors to Tanabe Seiyaku Co., Ltd., Osaka, Japan
No Drawing. Filed Sept. 14, 1964, Ser. No. 396,423
Claims priority, application Japan, Sept. 18, 1963, 38/50,127
4 Claims. (Cl. 260—294.7)

This invention relates to new chemical compounds which are useful as antagonists for morphinous analgesics. These compounds are derivatives of 1-allyl-3-(3-hydroxyphenyl)-piperidine and are represented by the following formula:

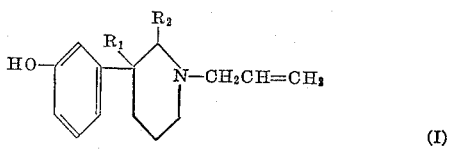

(I)

wherein $R_1$ represents a member selected from the class consisting of lower alkyl and benzyl radicals and $R_2$ represents a member of the class consisting of hydrogen and lower alkyl radicals.

We have found that the above mentioned 1-allyl-3-(3-hydroxyphenyl)-piperidine compounds have an antagonistic effect against morphine. Among them, 1-allyl-3-(3-hydroxyphenyl)-3-methyl-piperidine antagonizes the analgesic effect of morphine on simultaneous injection at a dose of 0.1–0.2 times as much as that of morphine.

The antagonistic effect against morphine was examined as follows: Groups of 10 male mice were given subcutaneously 20 mg./kg. of morphine and 1-allyl-3-(3-hydroxyphenyl)-3-methyl-piperidine at separate parts of the back. Pain response was tested by Haffner's method 15, 30, 45, 60, 90 and 120 minutes after the injection.

The results are shown in Table 1:

TABLE 1

| Antagonist dosage (mg./kg.) | Percentages of mice in analgesia | | | | | |
|---|---|---|---|---|---|---|
| | 15 (min.) | 30 (min.) | 45 (min.) | 60 (min.) | 90 (min.) | 120 (min.) |
| 0 | 40 | 80 | 70 | 60 | 40 | 10 |
| 2 | 0 | 0 | 0 | 20 | 10 | 0 |
| 4 | 0 | 0 | 0 | 10 | 10 | 0 |

These new compounds can be prepared by reacting allyl halide such as allyl bromide or allyl chloride with a 3-(3-methoxyphenyl)-piperidine compound of the formula:

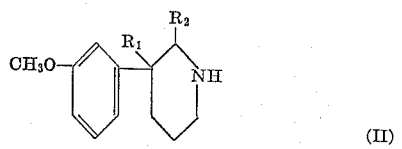

(II)

in which $R_1$ and $R_2$ have the same significance as described above, in the presence of potassium carbonate to obtain corresponding N-allyl compound and hydrolyzing the product with hydrohalic acid.

The allylation may be preferably carried out in an organic solvent such as acetone, methanol, ethanol, propanol or aqueous mixtures thereof. The reaction is advantageously carried out at the boiling point of the reaction mixture. Potassium carbonate may be replaced by another acid acceptor such as sodium carbonate, alkali metal bicarbonates, alkali metal hydroxides, pyridine, etc. An excess of the starting amine may be also used for this purpose as well. After this step, the remaining part of the starting compound may be removed from the reaction mixture in the form of its N-acetyl derivative. 1-allyl-3-(3-methoxyphenyl)-piperidine compounds which have been obtained by the above mentioned procedure are then hydrolyzed wtih hydrohalic acid, such as hydrochloric acid or hydrobromic acid to obtain the final products by cleavage of the ether linkage. The products of this invention form acid addition salts with various inorganic or organic acids, such as hydrochloric, hydrobromic, sulfuric, acetic, oxalic acids. Examples of the starting piperidine compounds represented by the Formula II are as follows:

3-(3-methoxyphenyl)-3-methyl-piperidine,
3-ethyl-3-(3-methoxyphenyl)-piperidine,
2,3-dimethyl-3-(3-methoxyphenyl)-piperidine,
3-(3-methoxyphenyl)-3-methyl-3-propyl-piperidine, and
3-benzyl-3-(3-methoxyphenyl)-2-methyl-piperidine.

Those compounds wherein $R_2$ is hydrogen can be prepared by the process described in "Chemical and Pharmaceutical Bulletin," vol. 11, pages 253–257.

Those having a lower alkyl substituent at the 2-position of the piperidine ring may be prepared as follows: 2-benzyl- or 2-lower alkyl-2-(3-methoxyphenyl)-acetonitrile is hydrolyzed to yield the corresponding carboxylic acid. Said carboxylic acid is caused to react with alkyl-lithium to produce the corresponding ketone. Then the ketone is condensed with acrylonitrile in the presence of a basic catalyst such as Triton B, and the addition product thus obtained is catalytically reduced, and link-closure effected with Raney nickel under pressure.

The following Examples A and B illustrate the preparation of 2,3-dimethyl-3-(3-methoxyphenyl)-piperdine and 3-benzyl-3-(3-methoxyphenyl)-2-methyl-piperidine.

*Example A*

50 g. of 2-(3-methoxyphenyl)-propionitrile was added to the mixture of 33 ml. of glacial acetic acid, 36 ml. of concentrated sulfuric acid and 28 ml. of water. The mixture was stirred for 3.5 hours at 90–100° C. and refluxed for additional 30 minutes at 130° C. Water was added to the reaction mixture and the separated oil was extracted with ether. The ethereal layer was washed with water and extracted with 10% sodium carbonate. Aqueous layer thereof was acidified with concentrated hydrochloric acid and re-extracted with ether. After evaporating off the ether, the residue was distilled under reduced pressure, whereby 45 g. of 2-(3-methoxyphenyl)-propionic acid was obtained. (B.P. 156–157° C./2 mm. Hg).

30 ml. of absolute ether solution containing 15 g. of the product was dropped with stirring into 200 ml. of absolute ether solution containing 0.33 mol of methyl-lithium at 0–5° C. within 25 minutes. The reaction mixture was stirred at the same temperature for additional 30 minutes and poured into ice water containing ammonium chloride. The ethereal layer was separated, washed with 10% sodium carbonate and water successively, dried with anhydrous sodium sulfate and evaporated to remove ether. The residue was distilled under reduced pressure. 14.2 g. of 3-(3-methoxyphenyl)-butane-2-one which occurs as oil was obtained. (B.P. 135–140° C./15 mm. Hg). To 70 ml. of dioxane solution containing 15.8 g. of the product, 1.5 ml. of Triton B (40% aqueous solution of benzyl-tri-methyl-ammonium hydroxide) was added, and 6.1 g. of acrylonitrile was dropped with stirring into the mixture within 30 minutes. The reaction mixture was stirred for additional 30 minutes at 45–50° C. and cooled. Dioxane was removed by evaporation, the residue was extracted with ether after the addition of an amount of water to the residue. The extract was dried, evaporated to remove ether, and the residue was distilled under reduced pressure, whereby 16.6 g. of oil, 4-acetyl-4-(3-methoxyphenyl)-n-valeronitrile was obtained. (B.P. 145–150° C./ 0.1 mm. Hg). 15 g. of the product and 15 ml. of Raney nickel were added to 80 ml. of methanol and the mixture was placed in an autoclave. Hydrogen gas was filled in the autoclave until the pressure reached 90 kg./cm.², then the autoclave was shaken for 2 hours at 120–130° C. The reaction mixture was filtered and the filtrate was evaporated to remove methanol. The residue was extracted with ether after the addition of an amount of water to the residue. The ethereal extract was extracted with 10% hydrochloric acid. The extract was alkalified with potassium carbonate and the separated oil was extracted with ether. The ethereal extract was dried and evaporated to remove ether. The residue was distilled under reduced pressure, whereby 12.0 g. of colorless oil which identified with 2,3-dimethyl-3-(3-methoxyphenyl)-piperidine was obtained. (B.P. 138–140° C./4 mm. Hg). The product showed a single peak in its gas chromatography. The hydrochloride: colorless prisms melting at 226–228° C. after recrystallization from ethanol.

Analysis.—Calculated for $C_{14}H_{21}NO \cdot HCl$: C, 65.74; H, 8.67; N, 5.48. Found: C, 65.84; H, 8.30; N, 5.42.

Example B 41 g. of 2-(3-methoxyphenyl)-3-phenyl-propionitrile was added to a mixture consisting of 30 ml. of water, 42 ml. of glacial acetic acid and 42 ml. of concentrated sulfuric acid. The mixture was refluxed for one hour. The reaction mixture was treated as in Example A, whereby 37 g. of 2-(3-methoxyphenyl)-3-phenyl-propionic acid was obtained. (B.P. 175–185° C./0.4 mm. Hg).

50 ml. of absolute ether solution containing 37 g. of the product was dropped into a solution consisting of 8.0 g. of lithium, 82 g. of methyl iodide and 350 ml. of absolute ether at 2–3° C. with stirring within 30 minutes. The reaction mixture was stirred for additional 30 minutes at 5–10° C. and was treated as in Example A. Thus, 34.5 g. of 3-(3-methoxyphenyl)-4-phenylbutane-2-one was obtained. (B.P. 136–137° C./0.3 mm. Hg). 1.2 ml. of Triton B was added to 65 ml. of dioxane solution containing 20 g. of the product. 20 ml. of dioxane solution containing 5 g. of acrylonitrile was dropped into the mixture at 20–36° C. and the mixture was stirred for 45 minutes at 40° C. The reaction mixture was treated as in Example A, and 18.6 g. of 4-acetyl-4-(3-methoxyphenyl)-5-phenyl-n-valeronitrile was obtained. (M.P. 119–120° C.). 17.5 g. of the product and 13 ml. of Raney nickel were added to 90 ml. of methanol and autoclaved for one hour at 110–120° C. as Example A. 13 g. of 3-benzyl-3-(3-methoxyphenyl)-2-methyl-piperidine was obtained. The perchlorate: colorless needles melting at 183–185° C. after recrystallization from acetone-ether.

Analysis.—Calculated for $C_{20}H_{26}O_5NCl$: C, 60.68; H, 6.62; N, 3.54. Found: C, 61.00; H, 6.54; N, 3.50.

Example 1

2 g. of 3-(3-methoxyphenyl)-3-methyl-piperidine was added to 30 ml. of a solution containing 1.2 g. of allyl bromide and 1.5 g. of potassium carbonate in acetone, and the mixture was refluxed for 8 hours on a water bath. The reaction mixture was filtered and the filtrate was concentrated. 2 ml. of acetic anhydride was added to the residue and heated for an hour on a boiling water bath. The mixture was poured into water, alkalified with potassium carbonate, and extracted with ether. The ethereal solution was extracted with 10% hydrochloric acid, the extract was alkalified with aqueous ammonia and extracted with ether again. The extract was evaporated to remove ether and the residue was distilled under reduced pressure, whereby colorless oil of 1-allyl-3-(3-methoxyphenyl)-3-methyl-piperidine. Yield: 1.8 g. B.P. 168–169° C./2 mm. Hg. The hydrochloride: M.P. 149–150° C. (from acetone-ether).

Analysis.—Calculated for $C_{16}H_{24}ClNO$: C, 68.20; H, 8.58; N, 4.97. Found: C, 68.38; H, 8.89; N, 5.00.

The colorless oil thus obtained was refluxed with 48% hydrobromic acid for 30 minutes, and the mixture was distilled under reduced pressure to remove hydrogen bromide. The residue was dissolved in water, alkalified with aqueous ammonia, extracted with ether, dried and removed ether by the evaporation. The remaining crude base of 1-allyl-3-(3-hydroxyphenyl)-3-methyl-piperidine (yield: 1.6 g.) was converted into the hydrochloride and recrystalized from acetone-ethanol-ether. M.P. 170–173° C. Yield: 1.0 g.

Analysis.—Calculated for $C_{15}H_{22}ClNO$: C, 67.27; H, 8.28; N, 5.22. Found: C, 67.06; H, 8.21; N, 5.18.

Example 2

1.9 g. of 3-(3-methoxyphenyl)3-n-propyl-piperidine was reacted with 0.98 g. of allyl bromide in the presence of potassium carbonate by the same procedure as described in Example 1, whereby 2.2 g. of 1-allyl-3-(3-methoxyphenyl)-3-n-propyl-piperidine hydrobromide was obtained. M.P. 164–165° C. (from acetone-ether).

Analysis.—Calculated for $C_{18}H_{28}BrNO$: C, 61.01; H, 7.96; N, 3.95. Found: C, 61.00; H, 7.80; N, 4.02.

1.0 g. of 1-allyl-3-(3-methoxyphenyl)-3-n-propyl-piperidine hydrobromide was hydrolyzed by the procedure as described in Example 1, whereby 0.8 g. of crude base of 1-allyl-3-(3-hydroxyphenyl)-3-n-propyl-piperidine was obtained. This product was converted into the hydrochloride and recrystallized from ethylacetate-ethanol. M.P. 158–160° C. (decomp.). Yield: 0.5 g.

Analysis.—Calculated for $C_{17}H_{26}ClNO \cdot \frac{1}{2}H_2O$: C, 66.97; H, 8.92; N, 4.59. Found: C, 67.22; H, 8.81; N, 4.72.

Example 3

2.2 g. of 2,3-dimethyl-3-(3-methoxyphenyl)-piperidine, 1.3 g. of allyl bromide and 1.65 g. of anhydrous potassium carbonate were dissolved in 30 ml. of acetone. The mixture was refluxed for 9 hours. After acetone was evaporated from the reaction mixture, a small amount of water was added to the residue. The mixture was extracted with ether. The extract was dried with anhydrous potassium carbonate, and evaporated to remove ether. 2 ml. of acetic anhydride was added to the residue, and the mixture was heated for one hour at 55° C. A small amount of water was added to the reaction mixture. The mixture was alkalified with potassium carbonate, and extracted with ether. The ethereal extract was re-extracted with 10% hydrochloric acid. The extract was alkalified with potassium carbonate, and re-extracted with ether. The extract was dried and evaporated to remove ether. The residue was crystallized from acetone, which gave colorless prisms of 1-allyl-2,3-dimethyl-3-(3-methoxyphenyl)-piperidine hydrochloride. Yield: 2.1 g. M.P. 158–160° C.

Analysis.—Calculated for $C_{17}H_{25}NO \cdot HCl$: C, 69.06; H, 8.86. Found: C, 69.48; H, 8.72.

1.2 g. of the hydrochloride and 6 ml. of 48% hydrobromic acid were refluxed for 45 minutes and cooled. The precipitating crystals were recrystallized from water, whereby 1.0 g. of colorless prisms of 1-allyl-2,3-dimethyl-3-(3-hydroxyphenyl)-piperidine hydrobromide were obtained. M.P. 207–208° C.

Analysis.—Calculated for $C_{16}H_{23}NO \cdot HBr$: C, 58.89; H, 7.41; N, 4.29. Found: C, 59.18; H, 7.15; N, 4.52.

Example 4

1.7 g. of 3-(3-methoxyphenyl)-2-methyl-3-n-propyl-piperidine, 30 ml. of acetone, 0.89 g. of allyl bromide and 1.1 g. of anhydrous potassium carbonate were mixed. The mixture was refluxed for 9 hours and filtered. After recovering acetone by evaporation, the residue was dissolved in ether. The ethereal solution was washed with water and a saturated aqueous solution of sodium chloride successively, and dried. Ether was removed by evaporation from the solution and 2 ml. of acetic anhydride was added to the residue. The mixture was allowed to stand for one hour, refluxed for 30 minutes, and treated as in Example 3 to remove remaining part of the starting amine and to purify the product. 1.7 g. of 1-allyl-3-(3-methoxyphenyl)-2-methyl-3-n-propyl-piperidine was obtained. The hydrobromide: prisms melting at 168–169.5° C. after recrystallization from acetone-ether. Yield: 2.1 g.

*Analysis.*—Calculated for $C_{19}H_{30}ONBr$: C, 61.95; H, 8.21; N, 3.80. Found: C, 62.09; H, 8.39; N, 3.87.

8 ml. of 47% hydrobromic acid was mixed with 1.3 g. of the hydrobromide and the mixture was refluxed for 30 minutes. The reaction mixture was alkalified with ammonia and extracted with ether. The extract was washed with a saturated aqueous solution of sodium chloride, and dried with anhydrous potassium carbonate. Ether was removed by evaporation. 1 g. of 1-allyl-3-(3-hydroxyphenyl)-2-methyl-3-n-propyl-piperidine was obtained. The oxalate melts at 207–210° C. with decomposition.

*Analysis.*—Calculated for $C_{18}H_{27}ON \cdot \frac{1}{2}C_2H_2O_4$: C, 71.67; H, 8.86; N, 4.40. Found: C, 71.42; H, 8.47; N, 4.45.

Example 5

2.2 g. of 3-benzyl-3-(3-methoxyphenyl)-2-methyl-piperidine was reacted with 0.97 g. of allyl bromide by the same procedure as described in Example 1, whereby 1-allyl-3-benzyl-3-(3-methoxyphenyl)-2-methyl-piperidine was obtained. The hydrochloride: needles melting at 221–222° C. with decomposition after recrystallization from ethyl acetate-methanol-ether. Yield: 2.5 g.

*Analysis.*—Calculated for $C_{23}H_{30}ONCl$: C, 74.27; H, 8.13; N, 3.77. Found: C, 74.10; H, 8.12; N, 3.77.

2.0 g. of the hydrochloride was hydrolyzed with 18 ml. of 47% hydrobromic acid by the same procedure as described in Example 1. 1.85 g. of 1-allyl-3-benzyl-3-(3-hydroxyphenyl)-2-methyl-piperidine was obtained. M.P. 248–250° C. with decomposition after recrystallization from methanol-ether. The hydrochloride: M.P. 251–253° C. with decomposition after recrystallization from methanol-ethylacetate.

*Analysis.*—Calculated for $C_{22}H_{28}ONCl$: C, 73.80; H, 7.88; N, 3.94. Found: C, 73.80; H, 7.69; N, 3.89.

What we claim is:

1. 1-allyl-3-(3-hydroxyphenyl)-3-methyl-piperidine.
2. 1-allyl-3-(3-hydroxyphenyl)-2,3-dimethyl-piperidine.
3. 1-allyl-3-(3-hydroxyphenyl)-3-methyl piperidine hydrochloride.
4. 1-allyl-3-(3-hydroxyphenyl)-3-methyl piperidine hydrobromide.

References Cited

UNITED STATES PATENTS

| | | | |
|---|---|---|---|
| 2,892,842 | 6/1959 | McElvain | 260—294.7 |
| 3,242,170 | 3/1966 | Merz et al. | 260—294.7 |

OTHER REFERENCES

Braenden et al., Bull. Wld. Hlth. Org., 1955 vol. 13, p. 964.

Eddy, J. Am. Pharm Assoc. (science ed.), vol. 39, pp. 245–248 and 257, May 1950.

Fieser et al., Advanced Org. Chem., pp. 308 and 309, Reinhold 1961, New York.

McElvain et al., J. Am. Chem. Soc., vol. 80, pp. 3915–3918 and 3922, August 1958.

Throp et al., J. Chem. Soc. (London), May 1948, pp. 559–561.

WALTER A. MODANCE, *Primary Examiner.*

A. D. SPEVACK, *Assistant Examiner.*